Figure 1:
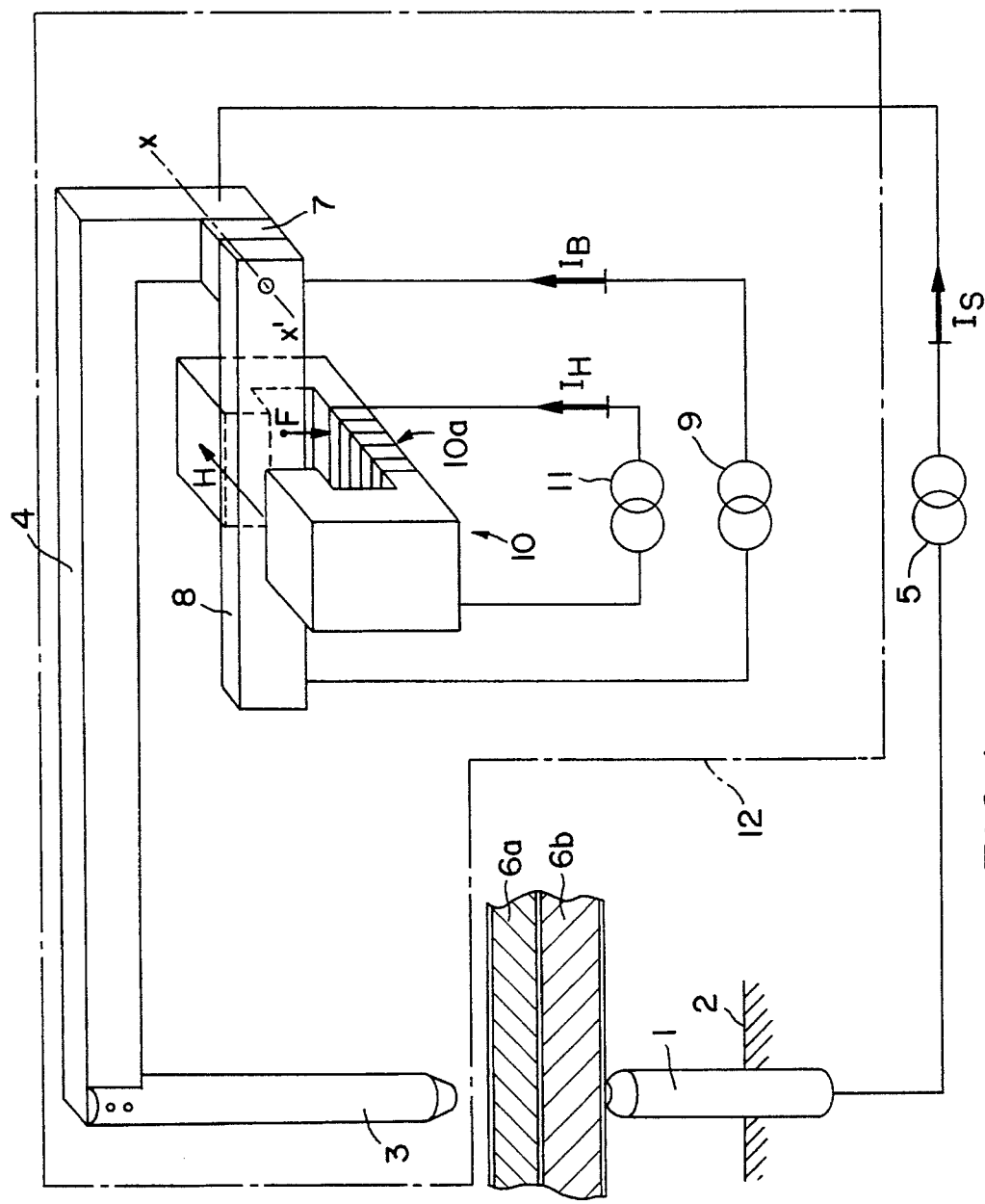

United States Patent [19]

Leon

[11] Patent Number: 5,477,020
[45] Date of Patent: Dec. 19, 1995

[54] MACHINE HEAD FOR SPOT WELDING FOR CRIMPING

[76] Inventor: Paul Leon, 2, Impasse des Sablons, F-27630 Berthenonville, France

[21] Appl. No.: 285,404

[22] Filed: Aug. 3, 1994

[30] Foreign Application Priority Data

Aug. 11, 1993 [FR] France .................................. 93 10023

[51] Int. Cl.$^6$ .................................................. B23K 9/28
[52] U.S. Cl. ............................................................ 219/86.32
[58] Field of Search ........................................... 219/86.32

[56] References Cited

U.S. PATENT DOCUMENTS 2,948,804  8/1960  Schueler et al. ...................... 219/86.32
4,902,869  2/1990  Wald .................................... 219/86.32

FOREIGN PATENT DOCUMENTS 273133  10/1987  European Pat. Off. .
120028  12/1918  United Kingdom .

Primary Examiner—Teresa J. Walberg
Assistant Examiner—J. Pelham
Attorney, Agent, or Firm—Laff, Whitesel, Conte & Saret, Ltd.

[57] ABSTRACT

The force (F) is derived from one or several electromagnetic forces each one of which is developed by the effect of a current ($I_s$, $I_B$) that circulates through a conductor (8) buried within a magnetic field.

9 Claims, 2 Drawing Sheets

MACHINE HEAD FOR SPOT WELDING FOR CRIMPING

The present invention relates to a head for a spot-welding or a crimping machine.

A spot welding machine comprises two electrodes provided so that they can tightly enclose the parts to be welded and so that the electrodes can supply to these parts to be welded, a high intensity electric current in order locally to raise their temperature and thus to form a welding point. During the welding operation, the electrodes are applied to the parts to be welded with a pre-set force.

Generally, an electrode is fixed while the other one is axially movable. The second is mounted inside a device, called welding head, that governs the movable electrode on the one hand in order to ensure its displacement during its setting into place on a part and on the other hand, to exert a pressure or force on the parts.

A crimping machine also comprises a head such as has just been described, with a movable electrode that exerts a power on the part to be crimped. It comprises a second electrode, but the latter is not necessarily within the axis of the first electrode. The object of the present invention also is a head for a crimping machine.

Welding or crimping machines generally are piloted by a computer that, during the welding or crimping operation computes—as a function of the measured parameters such as the temperature of the welding or crimping point, such as the relative displacement of the electrodes, such as the intensity of the welding or crimping current and/or the intensity of the force applied to the parts to be welded—the values for the intensity of the welding or crimping current and/or for the intensity of the force applied to the parts, etc.

The response time of the welding current source does not present any real problem and is not an object of the present invention.

For the application of force on the parts to be welded, crimped, or stamped, the movable electrode of the known welding or crimping heads generally is governed by one or two pneumatic jacks, one of them ensuring the displacements of the electrode for its positioning on a part to be welded and the other one making possible the application of the tightening force on the parts to be welded.

Such means cannot be satisfactory to obtain response times short enough, that would prevent, at the interface between the electrodes and the parts to be welded or crimped, the formation of micro-arcs, of metal projections etc. that generally occur during welding or crimping operations and that cause metallurgical defects of the points, variations in the metallurgical health of these points, and reductions in the life of the electrodes.

The purpose of the present invention therefore is to provide a welding or crimping head in which the response time for an application of the power on the parts to be welded or on the part to be crimped, by the movable electrode is as short as possible in order to make it possible to overcome the above-mentioned difficulties.

To that end, a head for a spot welding or a crimping machine according to the present invention is remarkable in that the force that is exerted on the parts to be welded or the part to be crimped during the welding or crimping operation, is derived from one or several electromagnetic forces each one of which is produced by the effect of a current circulating through a conductor buried within a magnetic field.

According to a first feature of the present invention, the current circulating through each conductor is the welding or crimping current.

According to another feature of the present invention, the current that circulates through each conductor is the current delivered by a source governed by a governing and control unit.

The magnetic field is developed, for example, by means of an electromagnet the winding of which is fed from a source of current the intensity of which is governed by said governing and control unit.

According to another characteristic of the present invention, each conductor is provided so as to be capable of displacement, by pivoting for example, within a plane that cuts the lines of the magnetic field.

According to one feature, the movable electrode is formed as one piece with the conductor. It is affixed to its free end, for example.

According to another feature, the electrode is affixed to the free end of an arm mounted so as to pivot at the same time as the conductor. Advantageously, the arm is electrically insulated from the conductor and the ends of the conductor respectively are connected to the terminals of a source of current, the welding current running through the arm.

Figure 2:
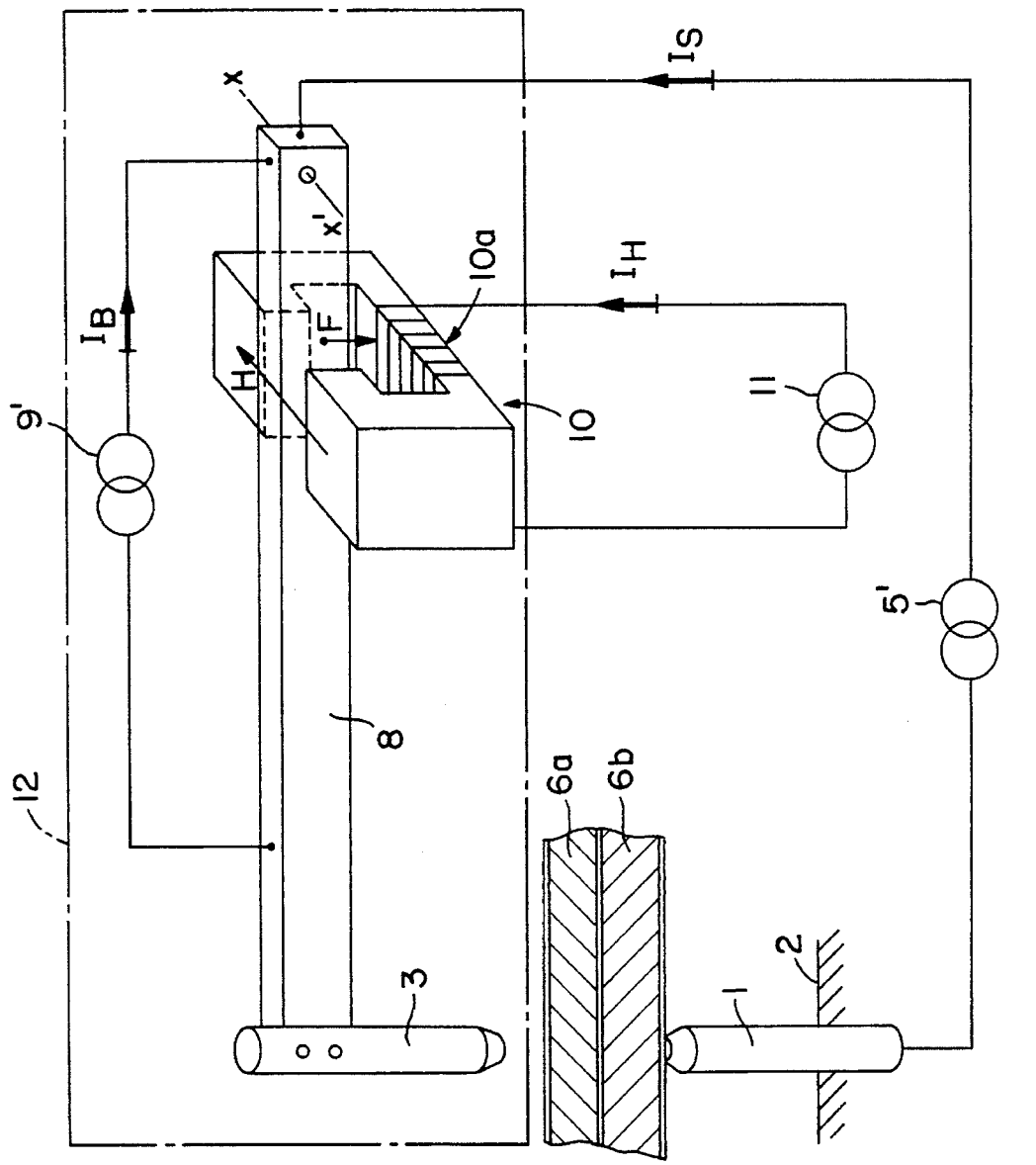

The above-mentioned characteristics of the present invention, as well as others, will appear more clearly upon a reading of the following description of one example of execution, this description being given in relation to the attached drawing in which:

FIG. 1 is a schematic view of a welding machine equipped with a head according to a first feature of the invention, and FIG. 2 is a schematic view of another welding machine equipped with a head according to a second feature of the present invention.

The welding machine schematically shown in FIG. 1 comprises a fixed electrode 1 coming as one piece with the frame 2 of the machine, and a movable electrode 3 that constitutes an element of the machine head.

The movable electrode 3 is mounted at the free end of an arm 4 mounted so that it can pivot around an axis xx'. Arm 4 is an electric conductor and it has its pivoting end connected to a first terminal of a source 5 of current the other terminal of which is connected to the fixed electrode 1.

The electrodes 1 and 3 are connected to the two terminals of the source 5 in order to be fed by the welding current $I_S$. The electrodes 1 and 3 tightly enclose and press together the two parts 6a and 6b which are to be welded.

On the pivoting end of arm 4 there is mounted, by means of an electrically insulating block 7, a first end of a conductor arm 8. The conductor arm, therefore, pivots around the axis xx' at the same time as arm 4. To the pivoting end of conductor 8 there is connected a first terminal of a source of current 9 the other terminal of which is connected to the free end of conductor 8. The current source 9 is provided so as to deliver a current $I_B$.

When conductor 8 pivots around the axis xx' it moves within a plane that is located within the air gap of an electromagnet 10 in which the terminals of winding 10a are respectively connected to the terminals of a source of current $I_H$. The pivoting plane of conductor 8 cuts the flux lines of the magnetic field delivered by electromagnet 10.

Thus it is conductor 8 and the current source 9, the electromagnet 9 and the source of current 11 as well as the movable electrode 3 that constitute a welding head 12 according to the present invention.

The functioning of a welding head 12 according to embodiment of the invention is as follows: An order is first given to the current source 11 to feed a current to electromagnet 10 that then develops a magnetic field H. An order is then given to the source of current 9, such that conductor 8 is subjected to a vertical force F the seat of which is located in the air gap of the electromagnet 10. It (the force) is directed downward to the extent that current $I_S$ and the magnetic field H are correctly oriented.

At that time, the arm 4 is subjected to a torque so that electrode 3 will exert a supporting force on the parts 6a and 6b to be welded. The source of current 5 is then ordered to deliver the welding current $I_S$.

In order to bring the movable electrode 3 into contact with the upper part 6a to be welded, and in order to establish a tightening pre-force, the source 9 is ordered to deliver a current $I_B$ of relatively low intensity. The force F therefore is of relatively low intensity until the welding current $I_S$ is established.

In order to modulate the intensity of the force F, it is possible to cause variations in the current intensity $I_B$ from source 9 that feeds arm 8, or to cause variations in the intensity of the current $I_H$ in the electromagnet 10. Thus, a computer such as the one mentioned in the preamble of the present specification pilots one or the other, or both, of the current sources 9 and/or 11 in order to modulate the intensity of the force tightening the parts 6a and 6b.

FIG. 2 shows another embodiment of a welding head according to the present invention. The same elements as those already present in the first embodiment are indicated by the same reference numbers.

This embodiment differs from the preceding one in that it comprises no arm 4 and in that the movable electrode 3 is affixed to the free end of conductor 8. The source 5' that delivers the welding current $I_S$ has its terminal connected, respectively, on one side to the fixed electrode 1 and, on the other side, to the pivoting end of conductor 8 that is opposite the one receiving the movable electrode 3. Thus, the welding current $I_s$ delivered by source 5' circulates through conductor 8 and, under the combined action of the magnetic field developed by the electromagnet 10, develops the force F that is then exerted on the conductor 8 and therefore on the movable element .

The current source 9', the terminals of which respectively are connected to the pivoting end of conductor 8 and to a point of conductor 8 close to the movable electrode 3, serves to establish the pre-force for the tightening of the parts 6a and 6b to be welded. It may be piloted by the computer indicated above, and thus make possible the modulation of the intensity of force F.

In this embodiment, the conductor 8 and the current source 9', the electromagnet 10 and the current source 11 as well as electrode 3 constitute a welding head according to the present invention.

It will be noted that the heads 12 may constitute heads for crimping machines.

It will further be noted that the arrangement of the various elements of the heads 12 could be different, especially the pivoting axis of the conductors 8, that might be located not at their ends, but along their length.

I claim:

1. A head for a spot-welding machine or for a crimping machine, said head comprising an electrode (3) for supplying a welding or crimping current ($I_s$) to a part (6a) which is welded onto another part (6b), or which is crimped, said electrode exerting a force (F) on said part (6a) during a welding or crimping operation, an electromagnet (10), and means for developing said force (F) responsive to at least one magnetic force, said magnetic forces being developed by the effect of a current ($I_s$, $I_B$) that circulates through a conductor flux lines of a magnetic field which is generated by said electromagnet (10).

2. A head according to claim 1, wherein the current that circulates through said conductor (8) is the welding or crimping current ($I_s$).

3. A head according to claim 1, wherein the current that circulates through said conductor (8) is a current delivered by a source of current (9, 9') governed by a governing and control unit.

4. A head according to any one of the preceding claims 1–3, wherein said conductor (8) is mounted to move within a plane that cuts the flux lines of said magnetic field.

5. A head according to claim 4, wherein said conductor (8) is mounted to pivot within a plane that cuts the flux lines of said magnetic field.

6. A head according to claim 4, wherein electrode (3) is one piece with said conductor (8), said one piece being movable.

7. A head according to claim 4, wherein said movable electrode (3) is fixed at a free end of said conductor (8).

8. A head according to claim 4, wherein said electrode (3) is affixed to a free end of an arm (4) coupled to pivot at the same time as said conductor (8) pivots.

9. A head according to claim 8, wherein said arm (4) is electrically insulated from said conductor (8) and opposite ends of said conductor (8) respectively are connected to the terminals of a source (9) of current, said welding current running through said arm (4).

\* \* \* \* \*